US010725362B2

(12) United States Patent
Chapman et al.

(10) Patent No.: US 10,725,362 B2
(45) Date of Patent: Jul. 28, 2020

(54) LIGHT WEIGHT TWO OR THREE AXIS REMOTE CAMERA HEAD

(71) Applicant: CHAPMAN/LEONARD STUDIO EQUIPMENT, INC., North Hollywood, CA (US)

(72) Inventors: Leonard T. Chapman, North Hollywood, CA (US); Stas Gorbatov, North Hollywood, CA (US); Hassan Kahn, North Hollywood, CA (US); David Gasparian, North Hollywood, CA (US)

(73) Assignee: Chapman/Leonard Studio Equipment, Inc., North Hollywood, CA (US)

( * ) Notice: Subject to any disclaimer, the term of this patent is extended or adjusted under 35 U.S.C. 154(b) by 0 days.

(21) Appl. No.: 16/385,904

(22) Filed: Apr. 16, 2019

(65) Prior Publication Data

US 2019/0339592 A1   Nov. 7, 2019

Related U.S. Application Data

(60) Provisional application No. 62/667,492, filed on May 5, 2018.

(51) Int. Cl.
*G03B 17/56* (2006.01)
*F16M 11/20* (2006.01)

(52) U.S. Cl.
CPC ....... *G03B 17/561* (2013.01); *F16M 11/2071* (2013.01)

(58) Field of Classification Search
CPC .................................................. G03B 17/561
See application file for complete search history.

(56) References Cited

U.S. PATENT DOCUMENTS

| 5,704,623 | A | 1/1998 | Chapman | |
|---|---|---|---|---|
| 7,209,176 | B2 | 4/2007 | Chapman | |
| 7,287,731 | B2 * | 10/2007 | Johnson | F16M 11/041 248/177.1 |

(Continued)

OTHER PUBLICATIONS

"How-To: Convert CineDrive Turntable to CineDrive Pan & Tilt Head" retrieved from Kessler support website http://support.kessler.com, Archive.org copy dated Jun. 9, 2016 (Year: 2016).*

(Continued)

*Primary Examiner* — Clayton E. LaBalle
*Assistant Examiner* — Leon W Rhodes, Jr.
(74) *Attorney, Agent, or Firm* — Perkins Coie LLP; Kenneth H. Ohriner

(57) ABSTRACT

A remotely controlled camera head has a pan frame including a first rectangular section. An upper end of a second rectangular section is joined to the left side of the first rectangular section. A pan motor in the first rectangular section of the pan frame rotates the pan frame about a pan axis co-axial with a hub when the pan motor is on. A tilt frame is rotatably attached to the lower end of the second rectangular section and movable about a tilt axis. In a two axis mode, a camera platform is attached to the tilt frame. A slide out may be used to change the length of the tilt frame. A tilt motor within the second rectangular section is connected to the tilt frame for rotating the tilt frame about a tilt axis when the tilt motor is on.

5 Claims, 12 Drawing Sheets

(56) References Cited

U.S. PATENT DOCUMENTS

| | | | | |
|---|---|---|---|---|
| 8,120,701 | B2 * | 2/2012 | Mayer | H04N 5/232 |
| | | | | 348/373 |
| 8,154,653 | B2 * | 4/2012 | Chapman | F16M 11/105 |
| | | | | 348/373 |
| 8,322,858 | B2 | 12/2012 | Chapman | |
| 8,684,530 | B2 | 4/2014 | Chapman | |
| 8,721,198 | B2 | 5/2014 | Chapman | |
| 8,733,478 | B2 | 5/2014 | Chapman | |
| 9,094,605 | B2 | 7/2015 | Chapman | |
| 9,200,700 | B2 * | 12/2015 | Kessler | F16H 57/022 |
| 9,638,986 | B1 | 5/2017 | Chapman | |

OTHER PUBLICATIONS

The Cobra Crane ProLine Pan Tilt Motion Control product page <https://cobracrane.com/pages/proline-pan-tilt-motion-contol-motorized-pan-tilt-head>, Dec. 15, 2016 Archive.org copy (Year: 2016).*

CS Base, Crane & Remote Arm Base, Chapman/Leonard Studio Equipment, Inc. 2008-2010 Catalog, Jan. 1, 2008, pp. 92-93.

* cited by examiner

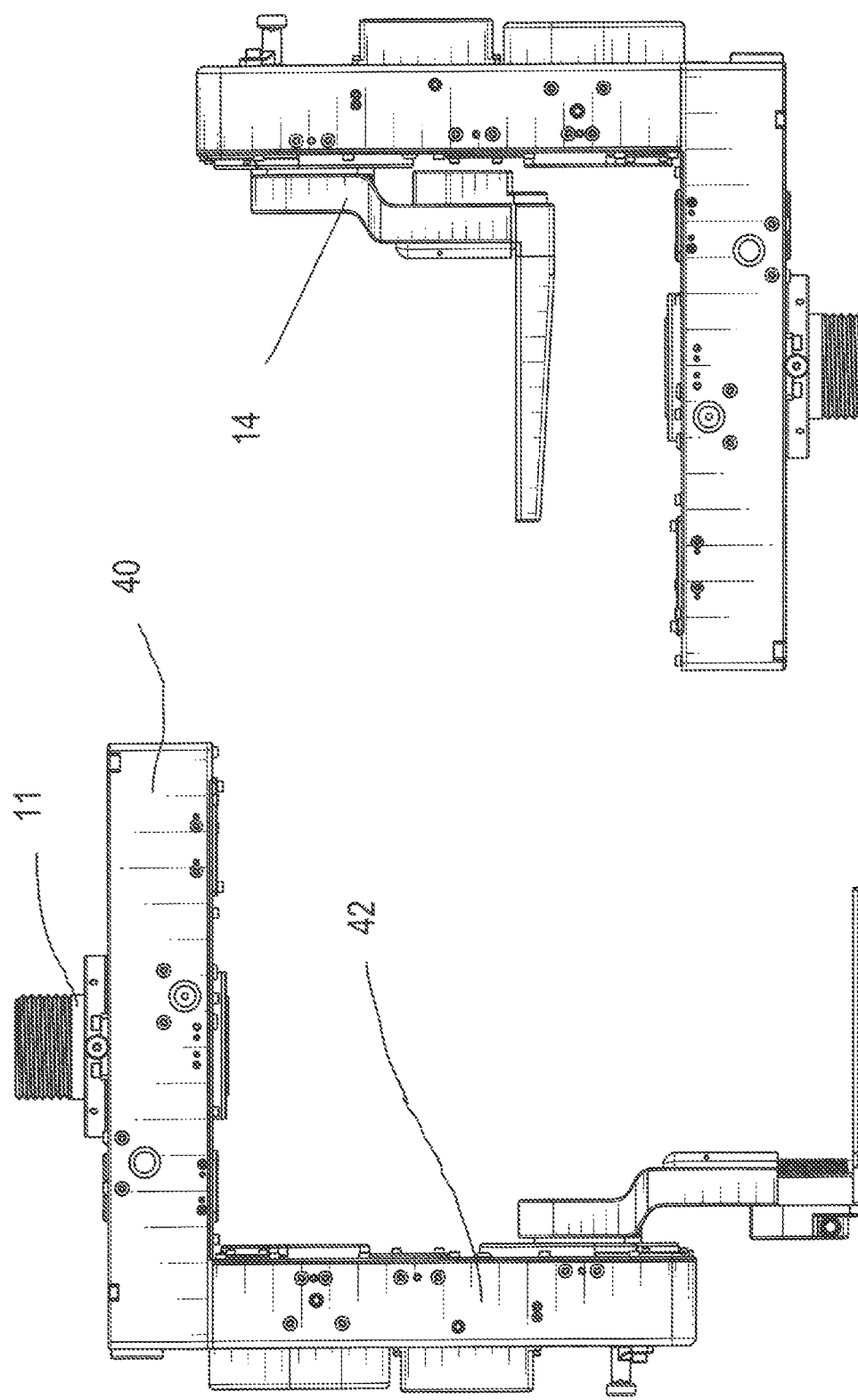

LIGHT WEIGHT TWO OR THREE AXIS REMOTE CAMERA HEAD

CROSS-REFERENCE TO RELATED APPLICATION(S)

This application claims priority to U.S. Provisional Patent Application No. 62/667,492 filed May 5, 2018 and incorporated herein by reference.

BACKGROUND

In motion picture, television, or video filming or recording, the camera is often supported on a vehicle, to follow an action or moving sequence, to achieve a desired camera angle or effect, or to film occupants in or on a vehicle. Various specialized camera cranes, dollys, and other mobile platforms have been used for this purpose. Over the last several years, remote camera heads have increasingly been used. A remote camera head is an apparatus that allows the camera to be moved, aimed, or controlled from a remote location (i.e., a location not immediately behind the camera).

Typically, a remote camera head is mounted on a crane arm. The crane arm can move the camera head, and the camera on the head, into locations not accessible using conventional camera operations (i.e., with a camera operator behind the camera and controlling camera movement by hand). For example, a camera on a camera head may be suspended on a crane arm extending out over the side of a tall building, a cliff, a waterfall, etc., i.e., in a position where it would be unsafe, impractical, or impossible to perform conventional camera operations.

In general, remote camera head operations involve placing the camera on a remote camera head which can perform pivoting or rotational movement in three axes, known as pan, tilt, and roll or dutch. Electric motors on or in the remote camera head are remotely controlled (via cables or wireless links) by a camera head operator, typically on the ground, or on the vehicle supporting the crane arm. Operation of the camera itself is similarly remotely controlled.

While camera heads have been successfully used in the past, there is a need for a compact and lightweight camera head which can be quickly and easily transported, installed, and made ready for use.

SUMMARY OF THE INVENTION

In a first aspect for a two axis embodiment, a camera head has a pan frame including a first rectangular section having a left side, a center area, and a right side. A hub is attached to the center area of the first rectangular section. An upper end of a second rectangular section is joined to the left side of the first rectangular section. A pan motor in the first rectangular section of the pan frame rotates the pan frame about a pan axis co-axial with the hub when the pan motor is on. A tilt frame is rotatably attached to the lower end of the second rectangular section of the pan frame and movable about a tilt axis. The camera head may include a slide out slideable into and out of the tilt frame, and a camera platform attached to the slide out, the slide out allowing a position of the camera platform to be changed, to accommodate varying camera sizes, or for balancing a payload on the camera platform. A tilt motor within the second rectangular section is connected to the tilt frame for rotating the tilt frame about a tilt axis perpendicular to the pan axis, when the tilt motor is on.

In a second aspect for a three axis embodiment, a roll axis module is attached to the tilt frame, and the camera platform is on the roll axis module. A motor or actuator in the roll axis module moves the camera platform about a roll axis, typically up to +/−30 degrees or 20 degrees. The roll axis module may have a width and a length less than the first rectangular section of the pan axis, so that the roll axis module does not add to the overall length or width of the camera head.

BRIEF DESCRIPTION OF THE DRAWINGS

FIG. 5 is a front view of the camera head in the two axis configuration, with the camera platform in an over slung position.

FIG. 6 is a front view of the camera head in the two axis configuration, with the camera platform in an under slung position.

DETAILED DESCRIPTION OF THE DRAWINGS

Figure 1:
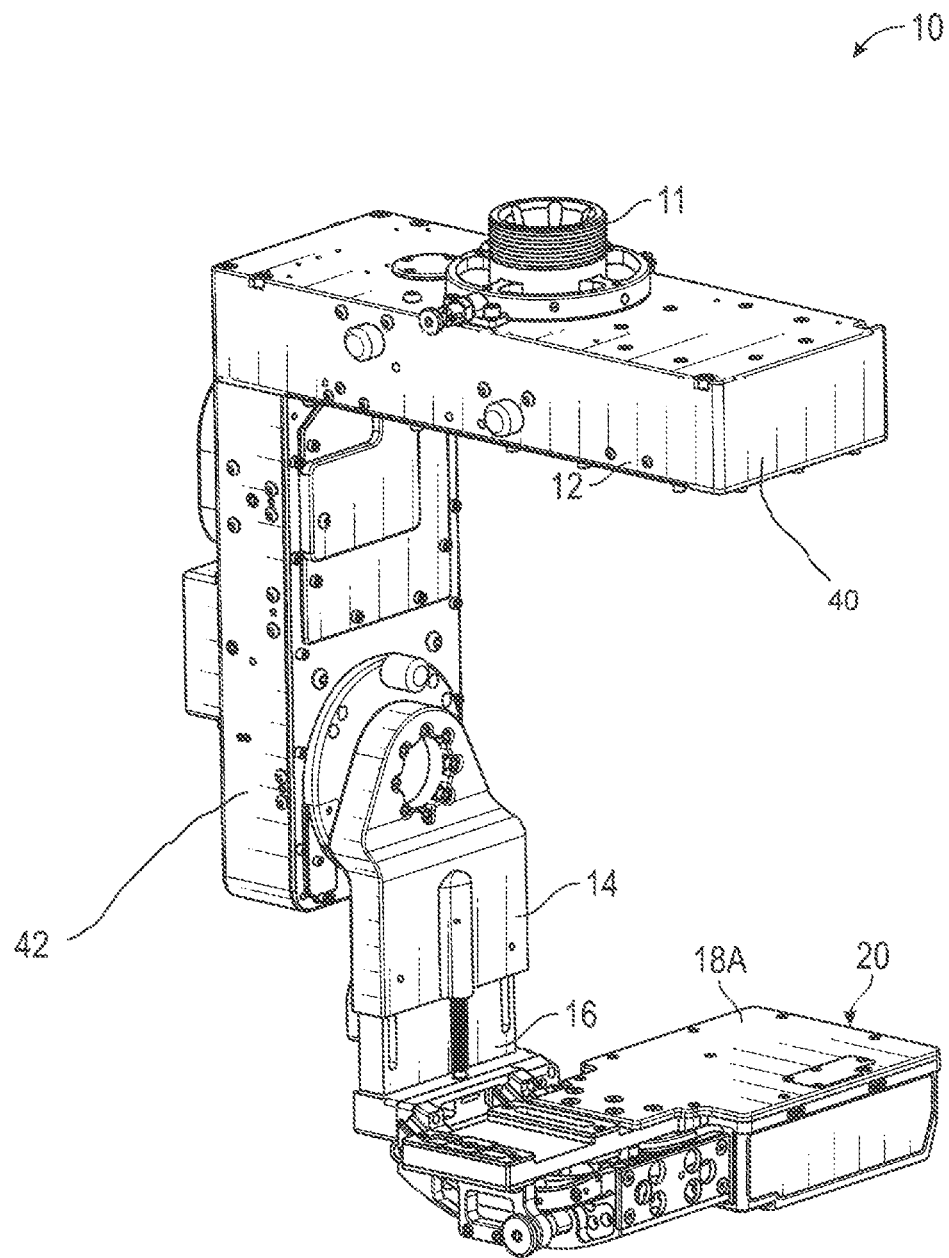
FIG. 1 is a perspective view of the camera head in a three axis configuration.
Figure 9:
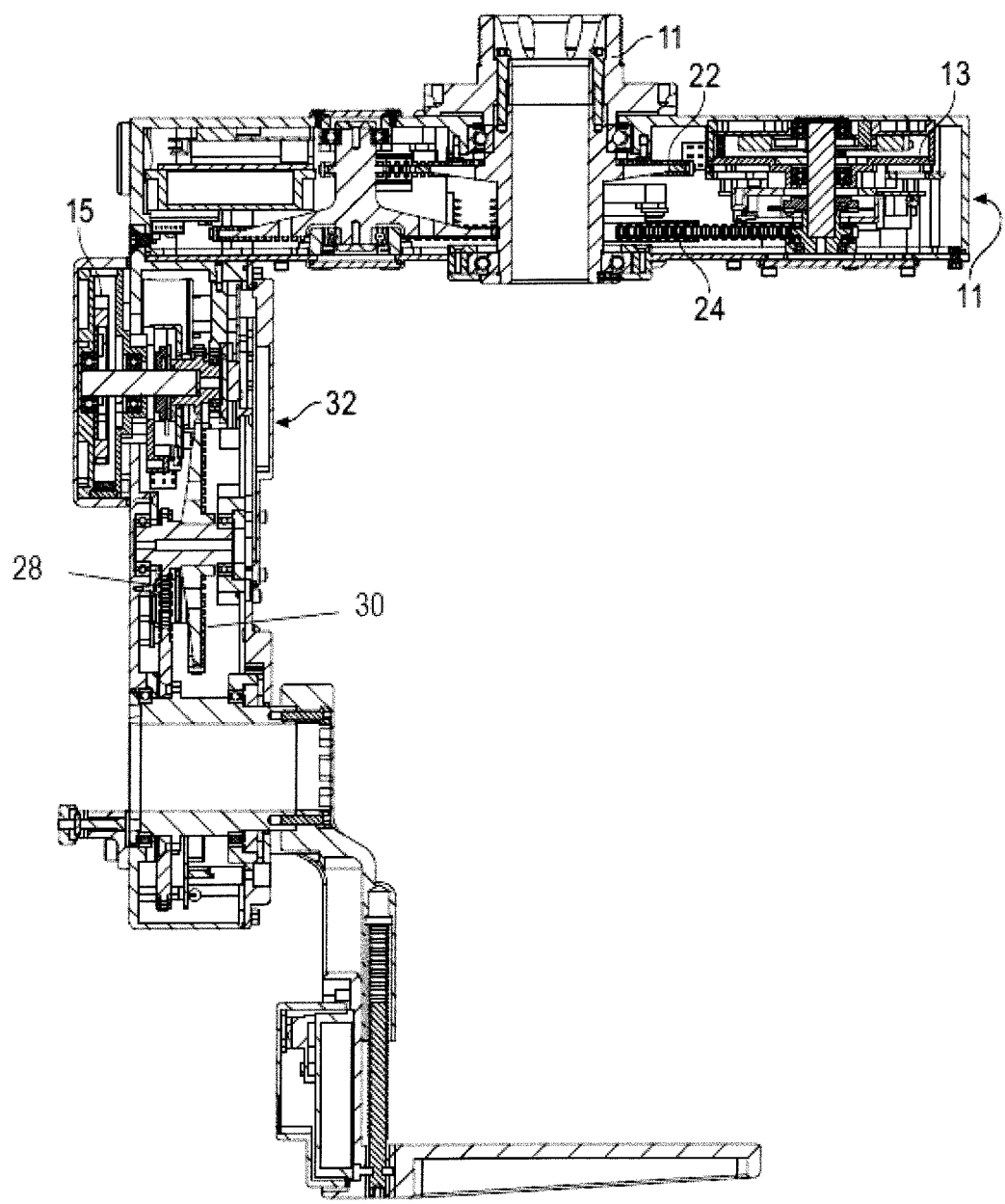
FIG. 9 is a section view of the camera head in the two axis configuration.

As shown in the Figures, a camera head 10 has a pan frame 12 and a tilt frame 14. The pan frame 12 includes a first or horizontal rectangular section 40 and a second or vertical rectangular section 42 joined to left or first end of the horizontal rectangular section 40. The horizontal rectangular section 40 is rotatably mounted on a hub 11 via bearings so that it is rotatable on the hub 11. As shown in FIG. 9, a pan motor 13 in the top section of pan frame rotates or pivots the pan frame about the centrally located hub 11 when the pan motor 13 is energized. Similarly a tilt motor 15 in vertical section 42 of the pan frame 14 rotates the tilt frame 14, when the tilt motor 15 is energized. The pan frame FIG. 1 shows a 3 axis configuration wherein a roll axis module 20 is attached to the tilt frame 14 to provide roll movement. The tilt frame 14 may include a slide out 16 attached to the camera platform 18, 18A, to allow the tilt frame 14 to be extended, to accommodate varying camera sizes, or for balancing a payload on the camera platform.

Figure 2:
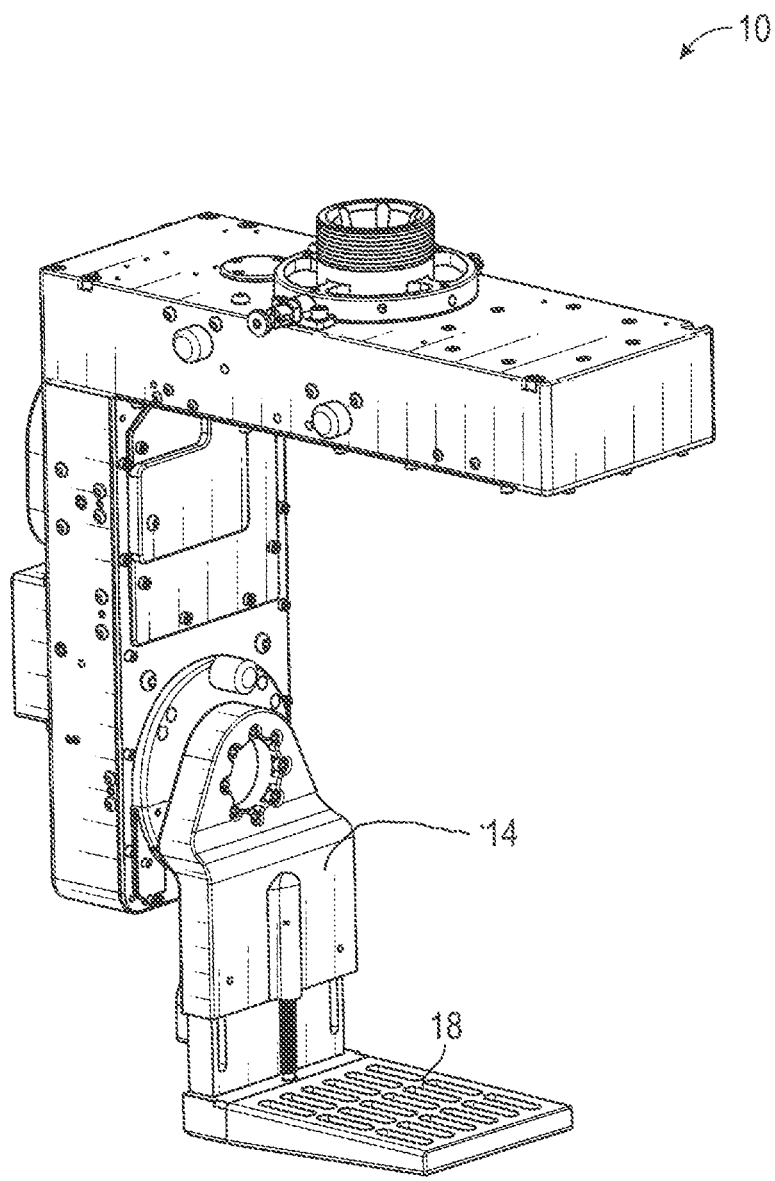
FIG. 2 is a perspective view of the camera head in a two axis configuration, via removing the roll axis module shown in FIG. 1.

FIG. 2 shows a two axis configuration having a camera platform 18 without using the roll axis module 20.

Figure 4:
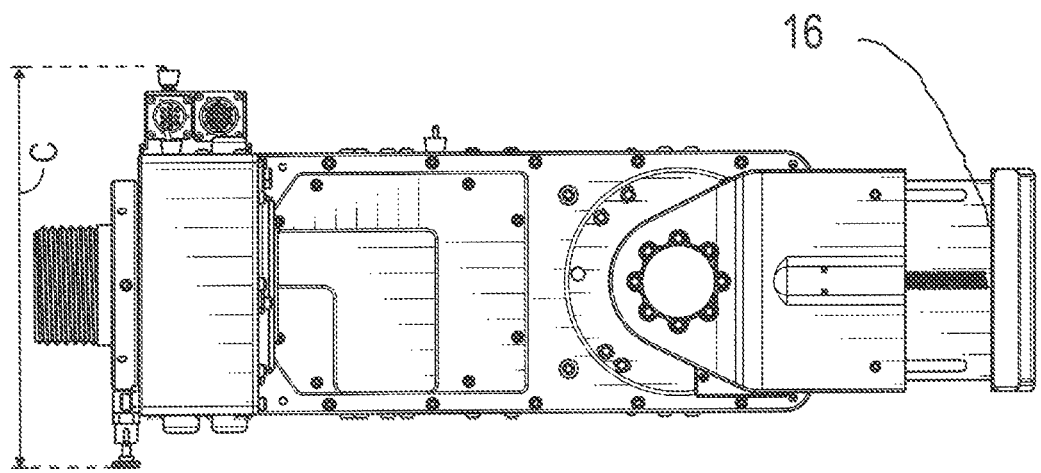
FIG. 4 is a side view of the camera head in a two axis configuration.
Figure 3:
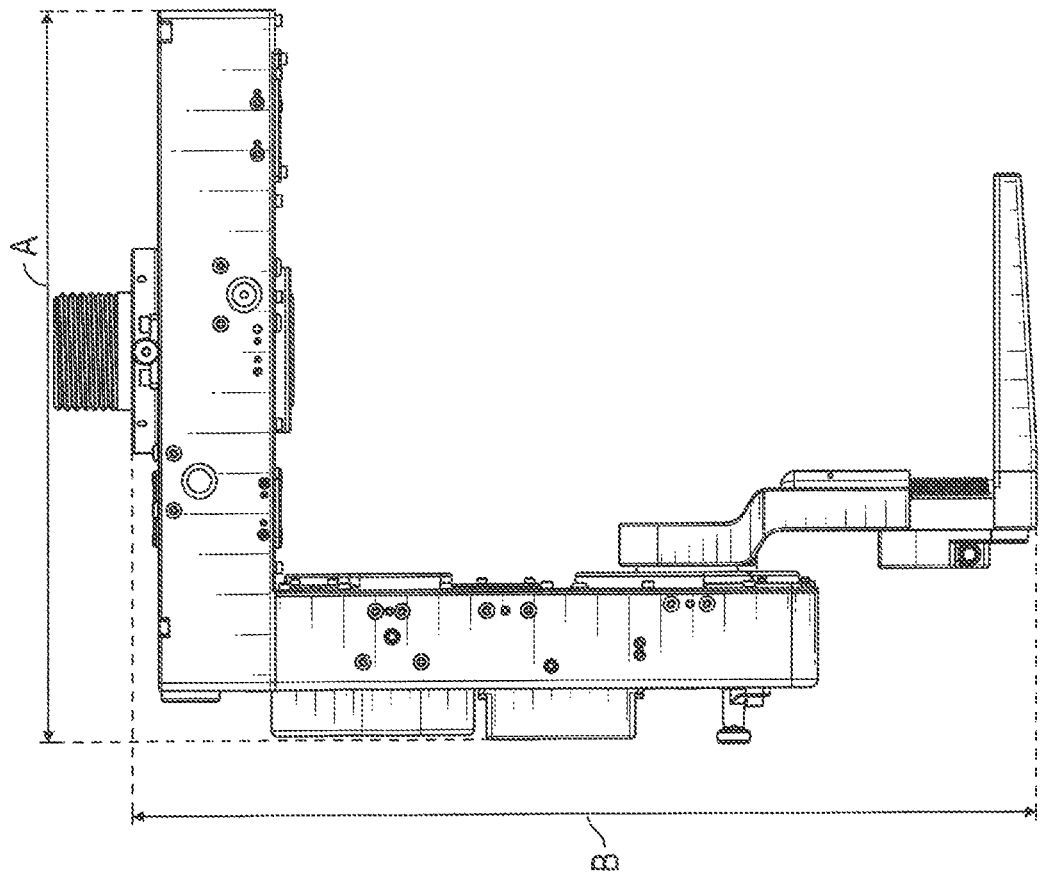
FIG. 3 is a front view of the camera head in the two axis configuration.
Figure 8:
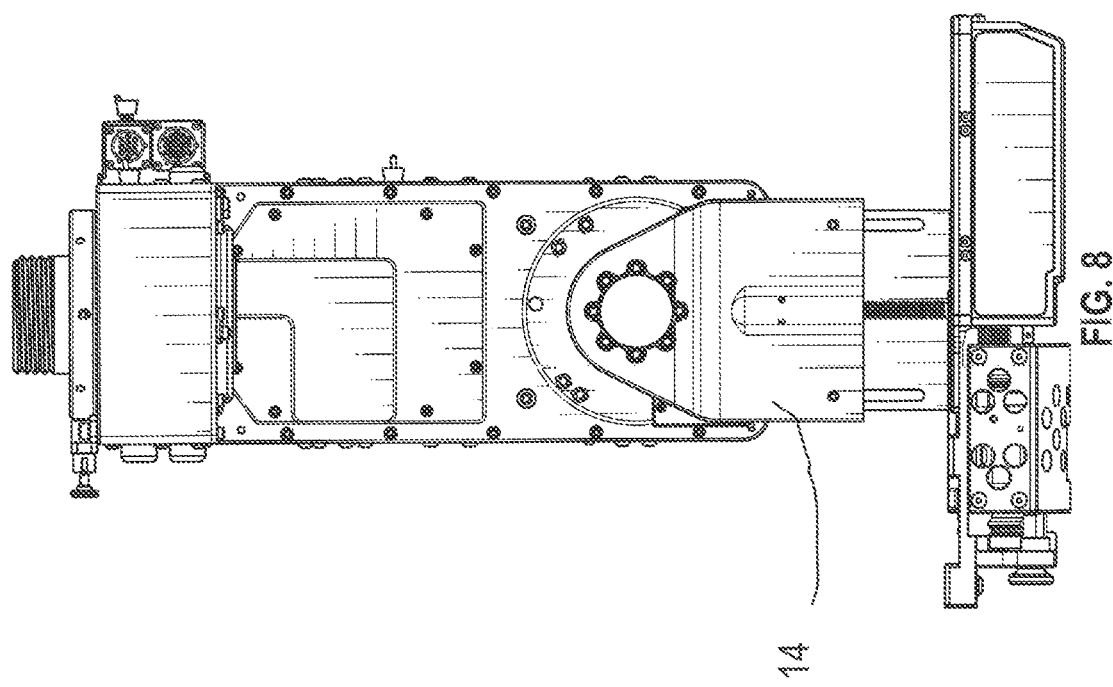
FIG. 8 is a side view of the camera head as it is shown in FIG. 7.
Figure 10:
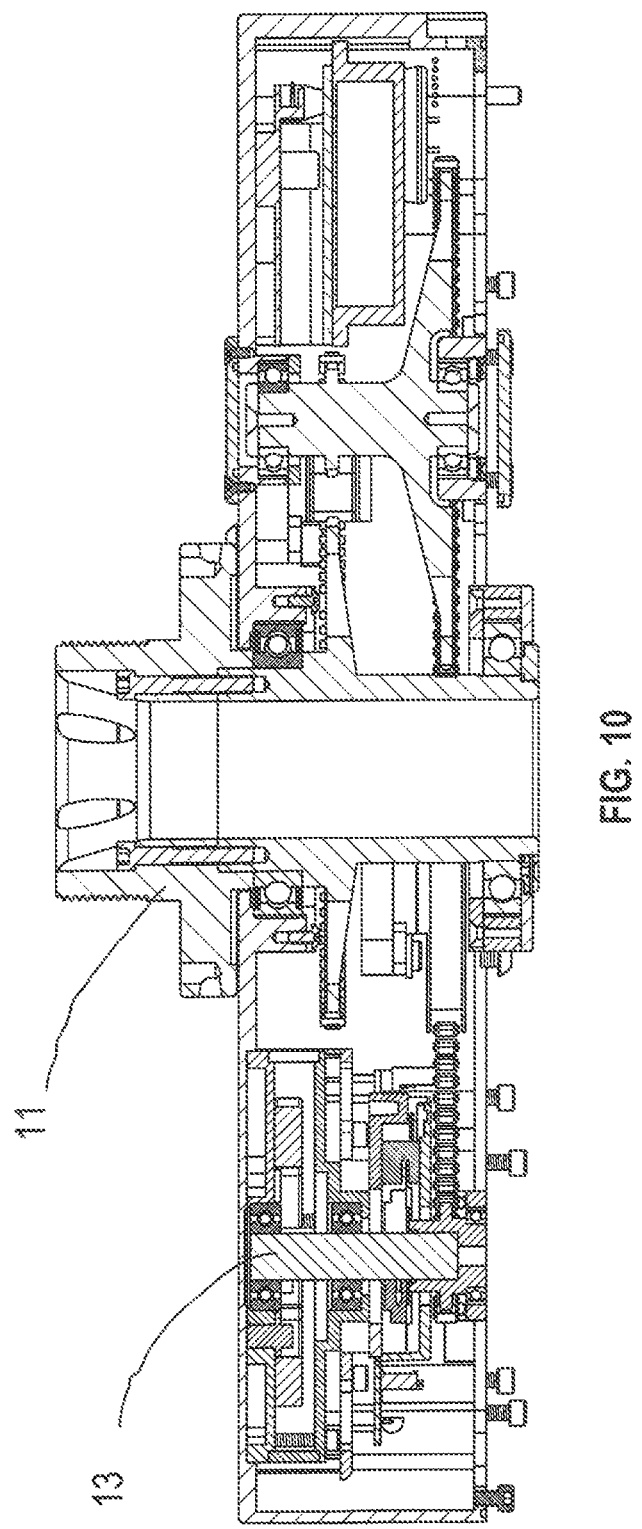
FIG. 10 is a section view through the top section of the pan frame.
Figure 11:
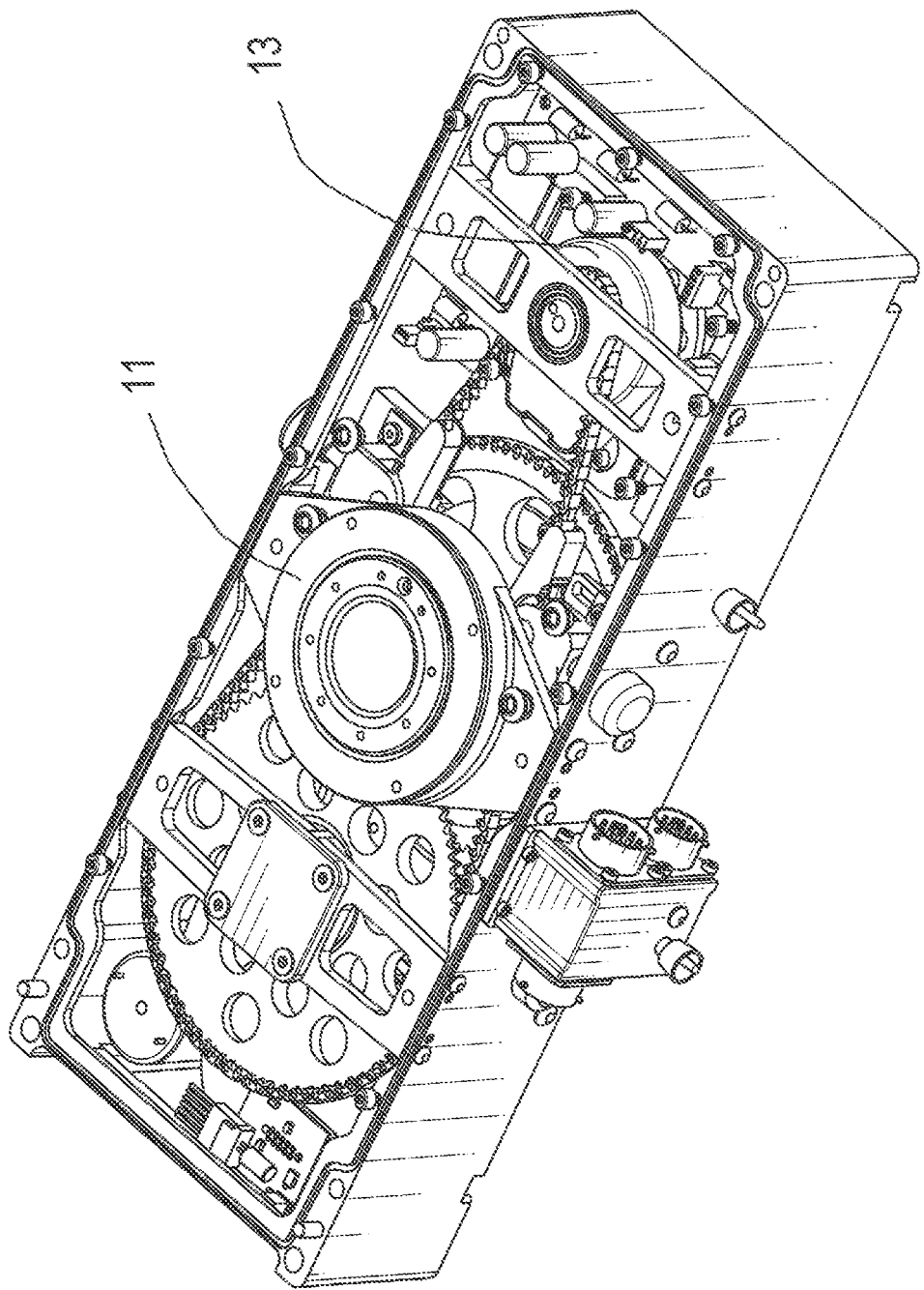
FIG. 11 is a perspective view of the top section of the pan frame, with the top cover removed for illustration.
Figure 12:
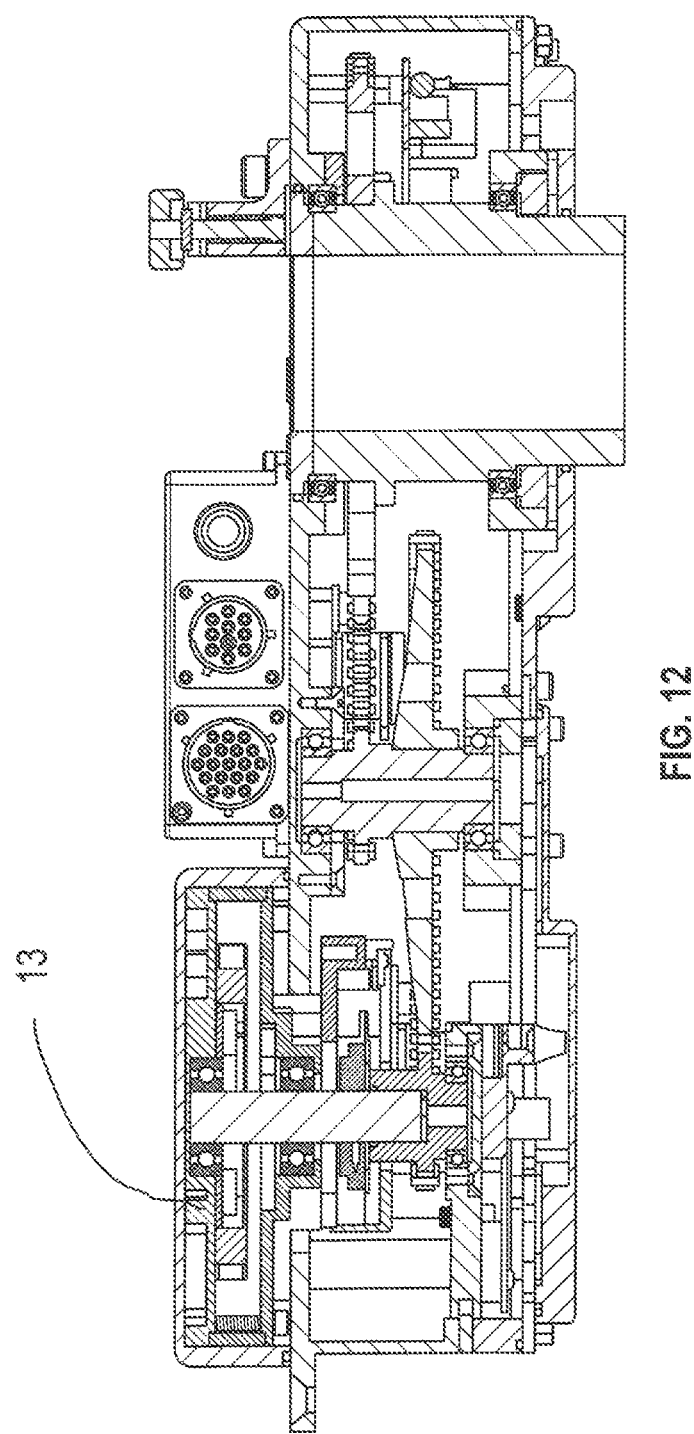
FIG. 12 is a section view through the side section of the pan frame.
Figure 13:
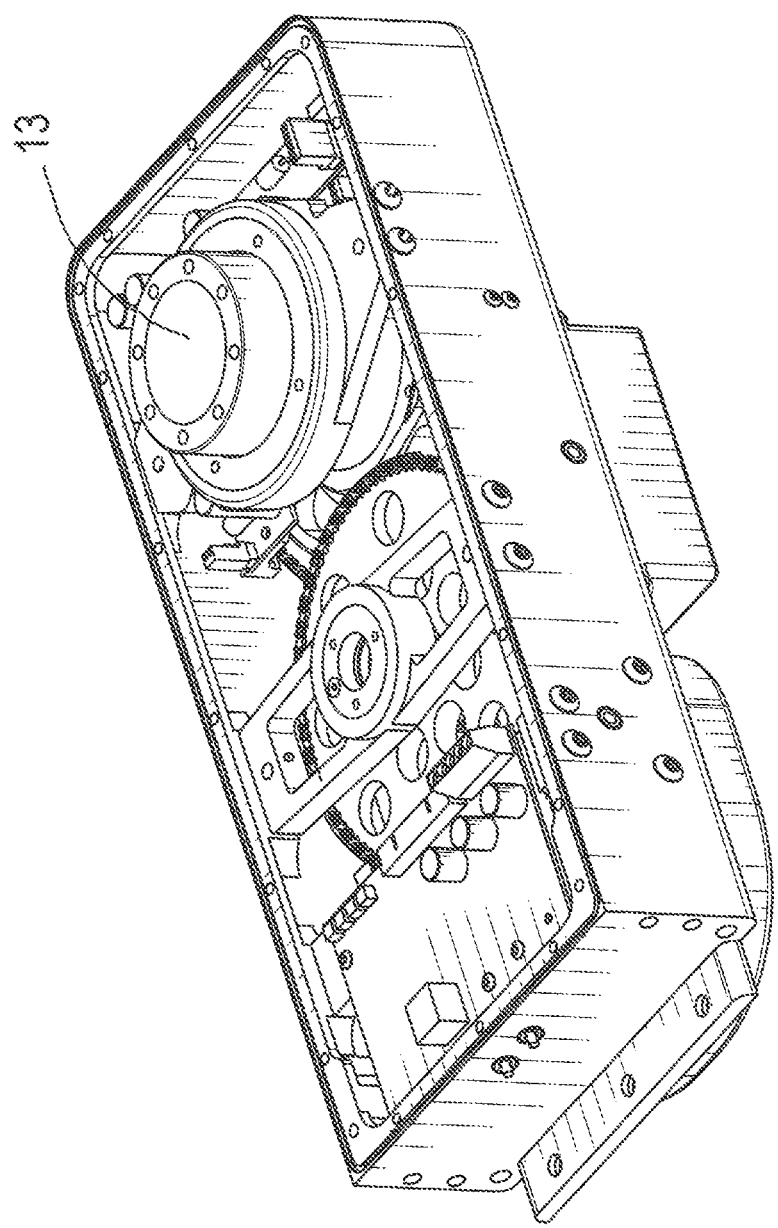
FIG. 13 is a perspective view of the side section of the pan frame, with the side cover removed for illustration.
Figure 14:
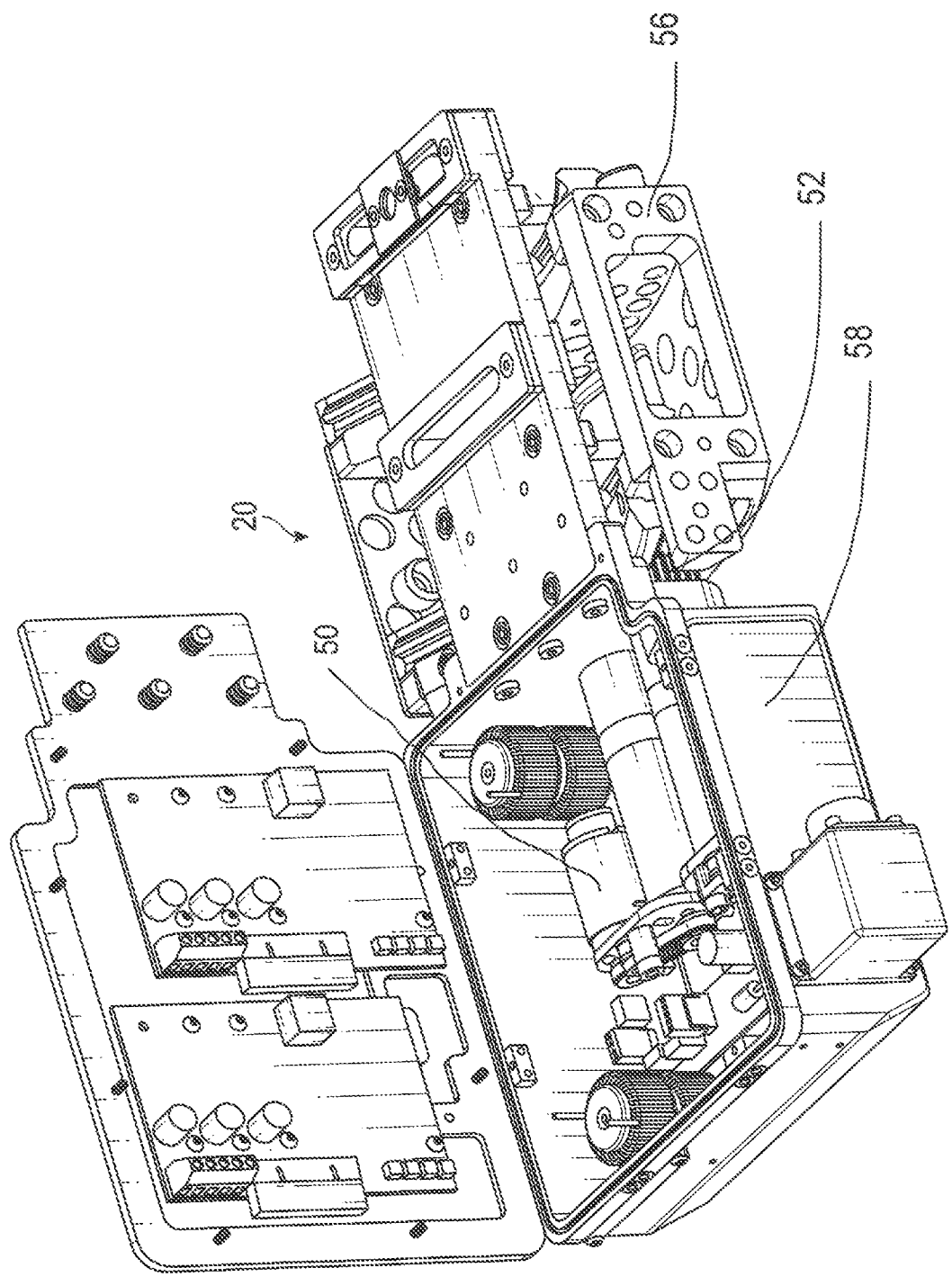
FIG. 14 is a perspective view of the roll axis module.
Figure 15:
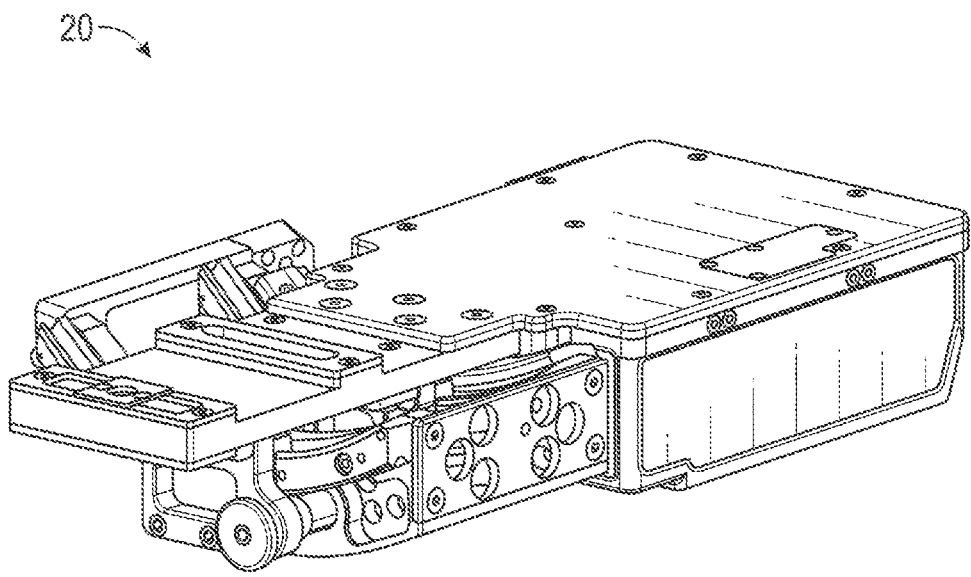
FIG. 15 is a perspective view of the roll axis module.

The camera head 10 is compact with dimension A in FIG. 3 ranging from 15 to 19 or 16 to 18 inches, and with dimension B ranging from 19 to 23 inches or 20-22 inches. Dimension C in FIG. 4 may range from 6 to 10 inches. The camera head 10 is also lightweight, weighing 20 pounds or less in the two axis mode. As shown in FIG. 6, the tilt frame is sufficiently compact that it can rotate 360+ degrees about the tilt axis without colliding or interfering with the pan frame. Referring to FIGS. 9-11, the camera head may use first and second stage chains 22, 24 and a pan motor 13 in the top section 26 of the pan frame to provide pan axis movement. Similarly, the camera head may first and second stage chains 28, 30 and a tilt motor 15 in the side section 32 of the pan frame to provide tilt axis movement. Design features as described in U.S. Pat. Nos. 7,209,176 and 8,721,198.

The roll axis module 20 has a roll axis motor 50 linked to a drive gear 52 through a gear reduction unit. The drive gear 52 meshes with a curved gear rack on a curved roll axis frame 56 which is pivotally supported on the roll axis module housing 58. Operation of the roll axis motor pivots the roll axis frame plus or minus 20 or 30 degrees from horizontal, allowing for roll axis camera movement.

Figure 7:
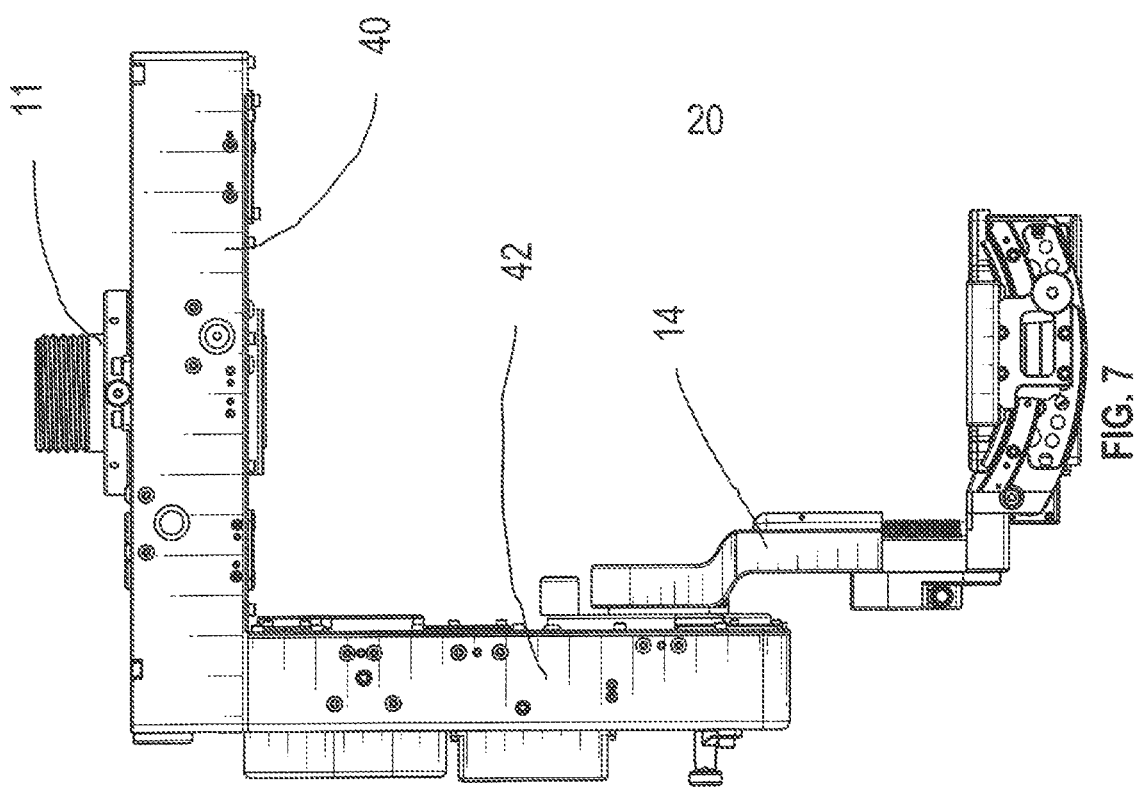
FIG. 7 is a front view of the camera head in the three axis configuration.

FIG. 7 shows the camera head 10 including the roll axis module 20, providing +/−20 degrees of roll movement. As show, the roll axis module is also compact and it resides within the envelope of the pan axis, thus not adding any width to the overall camera head 10.

The camera head 10 may be a two or a three axis gyro stabilized remote head. The head 10 may be capable of turning off stabilization on each individual axis. The head 10 may include back pan compensation, CGI capability, three axis capability with auto horizon, and/or wireless operations capability. The head 10 may be controlled by a wheel console or via joysticks. The head 10 may handle camera packages ranging from small to large, and have a complete balancing system for multiple lenses ranging from small to large.

The invention claimed is:

1. A camera head comprising:
   a pan frame including a first rectangular section having a left side, a center area, and a right side, wherein the pan head is L-shaped with the right side of the first rectangular section unattached to any element;
   a hub attached to the center area of the first rectangular section, the hub having a through hole extending through the first rectangular section;
   a second rectangular section having an upper end and a lower end;
   the upper end of the second rectangular section joined to the left side of the first rectangular section;
   a pan motor in the first rectangular section of the pan frame for rotating the pan frame about a pan axis co-axial with the hub when the pan motor is switched on, the pan motor driving a first stage pan chain and a second stage pan chain for rotating the pan frame;
   a tilt frame rotatably attached to the lower end of the second rectangular section of the pan frame and movable about a tilt axis;
   a slide out slideable into and out of the tilt frame, and a camera platform attached to the slide out, the slide out allowing a position of the camera platform to be changed, to accommodate varying camera sizes, or for balancing a payload on the camera platform; and
   a tilt motor within the second rectangular section of the pan frame, the tilt motor connected to the tilt frame for rotating the tilt frame about a tilt axis, perpendicular to the pan axis, when the tilt motor is energized, the tilt motor driving a first stage tilt chain and a second stage tilt chain to rotate the tilt frame.

2. The camera head of claim 1 wherein the first and second rectangular sections have substantially the same length.

3. The camera head of claim 1 wherein the first and second rectangular sections each has a length of 36 to 48 centimeters.

4. The camera head of claim 1 wherein the tilt frame is rotatable 360+ about the tilt axis without interfering with the pan frame.

5. A camera head comprising:
   an L-shaped pan frame including a first rectangular section having a left side, a center area, and a right side, wherein the right side of the first rectangular section unattached to any element;
   a hub attached to the center area of the first rectangular section, the hub having a through hole extending through the first rectangular section;
   a second rectangular section having an upper end and a lower end;
   the upper end of the second rectangular section joined to the left side of the first rectangular section;
   a pan motor in the first rectangular section of the pan frame for rotating the pan frame about a pan axis co-axial with the hub when the pan motor is switched on, the pan motor driving a first stage pan chain and a second stage pan chain for rotating the pan frame;
   a tilt frame rotatably attached to the lower end of the second rectangular section of the pan frame and movable about a tilt axis;
   a slide out slideable into and out of the tilt frame, and a camera platform attached to the slide out, the slide out allowing a position of the camera platform to be changed, to accommodate varying camera sizes, or for balancing a payload on the camera platform;
   a tilt motor within the second rectangular section of the pan frame, the tilt motor connected to the tilt frame for rotating the tilt frame about a tilt axis, perpendicular to the pan axis, when the tilt motor is energized, the tilt motor driving a first stage tilt chain and a second stage tilt chain to rotate the tilt frame; and
   a roll axis module having a roll axis motor linked to a drive gear through a gear reduction unit, the drive gear meshed with a curved gear rack on a curved roll axis frame which is pivotally supported on a housing of the roll axis module housing, the roll axis motor operable to pivot the roll axis frame plus or minus 20 or 30 degrees from horizontal, allowing for roll axis camera movement, the roll axis module residing within an envelope of the pan axis to not add any width overall to the camera head.

* * * * *